(12) United States Patent
Ha et al.

(10) Patent No.: US 12,174,146 B2
(45) Date of Patent: Dec. 24, 2024

(54) APPARATUS FOR AND METHOD OF MEASURING PERMANENT-MAGNET EDDY-CURRENT LOSS

(71) Applicants: HYUNDAI MOTOR COMPANY, Seoul (KR); KIA CORPORATION, Seoul (KR); IREA SYSTEM INDUSTRY, Changwon-si (KR)

(72) Inventors: Seok Jin Ha, Hwaseong-si (KR); Ho Jin An, Yangsan-si (KR); Min Uk Lee, Changwon-si (KR)

(73) Assignees: HYUNDAI MOTOR COMPANY, Seoul (KR); KIA CORPORATION, Seoul (KR); IREA SYSTEM INDUSTRY, Changwon-si (KR)

( * ) Notice: Subject to any disclaimer, the term of this patent is extended or adjusted under 35 U.S.C. 154(b) by 345 days.

(21) Appl. No.: 17/831,016

(22) Filed: Jun. 2, 2022

(65) Prior Publication Data
US 2023/0118244 A1    Apr. 20, 2023

(30) Foreign Application Priority Data

Oct. 14, 2021    (KR) .......................... 10-2021-0136838

(51) Int. Cl.
*G01N 27/90*    (2021.01)

(52) U.S. Cl.
CPC ................................ *G01N 27/9006* (2013.01)

(58) Field of Classification Search
CPC ...... G01R 33/1215–123; G01R 33/007; G01R 33/0076; G01R 33/0082; G01R 33/02–0286; G01R 33/038–0385; G01R 33/06–10; G01N 27/72; G01N 27/80;
(Continued)

(56) References Cited

U.S. PATENT DOCUMENTS

| | | | | |
|---|---|---|---|---|
| 4,573,012 A | * | 2/1986 | Bisson | G01R 33/123 324/225 |
| 7,248,041 B2 | * | 7/2007 | Manring | G01R 33/123 324/228 |
| 8,076,929 B2 | * | 12/2011 | Badoux | G01N 27/9006 324/228 |

FOREIGN PATENT DOCUMENTS

| | | | |
|---|---|---|---|
| JP | H07-218610 A | 8/1995 | |
| JP | H11-295403 A | 10/1999 | |
| JP | 2003234225 A | * 8/2003 | ............. H01F 41/00 |

(Continued)

OTHER PUBLICATIONS

Munekatsu et al.; Translation of JP 2003234225 A; Aug. 22, 2003; Translation by EPO & Google (Year: 2003).*

(Continued)

*Primary Examiner* — Eman A Alkafawi
*Assistant Examiner* — Rahul Maini
(74) *Attorney, Agent, or Firm* — MCDONNELL BOEHNEN HULBERT & BERGHOFF LLP (57) ABSTRACT

An apparatus for and a method of measuring permanent-magnet eddy-current loss is provided. A magnetic flux density measured in a Gaussmeter 60 is fed back to a control device 70, and thus operation of a power supply 80 is automatically controlled. Accordingly, an experiment can be efficiently conducted. A non-magnetic and non-conductive measurement jig 30 blocks heat generated in a permanent magnet sample from being dissipated to an iron core 10. Accordingly, eddy-current loss occurring in the permanent magnet sample 40 can be measured more precisely.

13 Claims, 8 Drawing Sheets

(58) Field of Classification Search
CPC ...... G01N 27/82; G01N 27/825; G01N 27/83; G01N 27/87; G01N 27/90–9093
USPC ....... 324/205, 222, 223, 224, 225, 226, 227, 324/228, 260–263
See application file for complete search history.

(56) References Cited

FOREIGN PATENT DOCUMENTS

| | | | | |
|---|---|---|---|---|
| JP | 2007-298336 A | 11/2007 | | |
| JP | 2009-270926 A | 11/2009 | | |
| JP | 2012145533 A | * | 8/2012 | |
| JP | 2013245958 A | * | 12/2013 | ............. G01R 33/12 |
| JP | 6701898 B2 | 5/2020 | | |
| KR | 2000-0057320 A | 9/2000 | | |
| KR | 2004-0073133 A | 8/2004 | | |

OTHER PUBLICATIONS

Hideaki et al.; Translation of JP 2013245958 A; Dec. 9, 2013; Translation by EPO & Google (Year: 2013).*
Kawabe et al.; Translation of JP2012145533A; Aug. 2, 2012; Translated by EPO & Google (Year: 2012).*

* cited by examiner

[TABLE 1]

| TYPE | NUMBER OF TURNS | ELECTRIC CURRENT (A) | MMF(AT) | FREQUENCY (Hz) | INPUT(W) | CORE + PM LOSS(W) | REACTIVE POWER(Var) | TEMPERATURE OF MAGNET (°C) | INDOOR TEMPERATURE (°C) | INCREASE IN TEMPERATURE (°C) | B(T) |
|---|---|---|---|---|---|---|---|---|---|---|---|
| 1P | 18 | 2 | 36 | 3317 | 11.924 | 11.865 | 20.68 | 39.8 | 25.7 | 14.1 | 0.0408 |
| 2P | 18 | 2 | 36 | 3317 | 20.306 | 20.247 | 24.178 | 48.9 | 26.2 | 22.7 | 0.0477 |
| 3P | 18 | 2 | 36 | 3317 | 28.662 | 28.603 | 32.948 | 52.8 | 25.6 | 27.2 | 0.0651 |

[TABLE 2]

| TYPE | NUMBER OF TURNS | ELECTRIC CURRENT (A) | MMF(AT) | FREQUENCY (Hz) | INPUT(W) | CORE + PM LOSS(W) | REACTIVE POWER(Var) | TEMPERATURE OF MAGNET (°C) | INDOOR TEMPERATURE (°C) | INCREASE IN TEMPERATURE (°C) | B(T) |
|---|---|---|---|---|---|---|---|---|---|---|---|
| 1P | 18 | 2 | 36 | 3317 | 11.924 | 11.865 | 20.68 | 39.8 | 25.7 | 14.1 | 0.0408 |
| 2P | 18 | 1.625 | 29.25 | 3317 | 13.762 | 13.723 | 16.796 | 40.6 | 25.2 | 15.4 | 0.0408 |
| 3P | 18 | 1.275 | 22.95 | 3317 | 10.811 | 10.787 | 13.154 | 35.7 | 25.4 | 10.3 | 0.0407 |

| TYPE | NUMBER OF TURNS | ELECTRIC CURRENT (A) | MMF(AT) | FREQUENCY (Hz) | INPUT(W) | CORE + PM LOSS(W) | REACTIVE POWER(Var) | TEMPERATURE OF MAGNET (°C) | INDOOR TEMPERATURE (°C) | INCREASE IN TEMPERATURE (°C) | B(T) |
|---|---|---|---|---|---|---|---|---|---|---|---|
| 1P | 18 | 3.9 | 70.2 | 3317 | 52.139 | 51.906 | 82.395 | 26.6 | 87.4 | 60.8 | 0.0834 |
| 2P | 18 | 2.961 | 53.298 | 3317 | 51.149 | 51.018 | 62.553 | 25.9 | 80.6 | 54.7 | 0.0834 |
| 3P | 18 | 2.257 | 40.626 | 3317 | 33.759 | 33.683 | 47.822 | 26.1 | 65.4 | 39.3 | 0.0837 |

APPARATUS FOR AND METHOD OF MEASURING PERMANENT-MAGNET EDDY-CURRENT LOSS

CROSS REFERENCE TO RELATED APPLICATIONS

The present application claims priority to Korean Patent Application No. 10-2021-0136838, filed Oct. 14, 2021, the entire contents of which is incorporated herein for all purposes by this reference.

BACKGROUND

Field

The present disclosure relates to a technology related with an apparatus for and a method of more precisely measuring eddy-current loss occurring in a permanent magnet sample.

Description of the Related Art

An apparatus for evaluating permanent-magnet eddy-current loss serves the purpose of simulating an environment in which temperature increases due to eddy-current loss in a permanent magnet within a drive motor when the drive motor operates and thus measuring the eddy-current loss in a state where a one-piece permanent magnet is present.

In a state where a permanent magnet sample is not seated in a void in an iron core, an apparatus in the related art adjusts the void suitably for a height of the permanent magnet sample, applies arbitrary electric current from a power supply device to a magnetic field coil, positions a Gaussmeter probe in the center of the void, measures a value of a magnetic flux density using a Gaussmeter, adjusts electric current in the power supply device in such a manner that the magnetic flux density measured in the center of the void becomes at a desired value, measures electric current applied at that time using an amperemeter, and records the measured electric current.

Thereafter, the Gaussmeter probe is removed from the center of the void, the permanent magnet sample on which an experiment is to be conducted is inserted into the void for being seated therein, electric current of the power supply device is set in such a manner as to reach the recorded electric current, and an increase in temperature of the permanent magnet is observed.

In order for the above-described method in the related art to be effective, an experiment is required to be conducted in a state where the permanent magnet sample is magnetized in the void in the iron core. However, in an actual situation, for safety reasons, an experiment is conducted in a state where the permanent magnet sample is not magnetized.

Because the non-magnetized permanent magnet sample operates as a magnetic body, when the same amount of electric current is applied to the magnetic field coil, the magnetic flux density is greatly increased when the permanent magnetic sample is present than when the permanent magnet sample is not present.

Therefore, as in the experimental method in the related art, in the state where the permanent magnet sample is not present, although electric current for the magnetic field coil is determined for supplying a desired magnetic flux density to the void, the magnetic flux density is increased much more when the non-magnetized permanent magnet sample is thereafter inserted into the void for being seated therein than when the permanent magnet sample is not present. Accordingly, there occurs an advantage in that it is impossible to measure precise eddy-current loss.

Particularly, in a state where the permanent magnet sample is inserted into the void, because there is no space into which the Gaussmeter probe is inserted, it is possible to measure the magnetic flux density. Alternatively, heat generated in the permanent magnet sample is dissipated to the iron core. This heat dissipation has an effect on temperature measurement. Thus, there occurs a disadvantage in that the eddy-current loss cannot be precisely measured.

The foregoing is intended merely to aid in understanding the background of the present disclosure and therefore should not be interpreted to admit that the present disclosure falls within the purview of the related art that is already known to a person of ordinary skill in the art.

SUMMARY

An objective of the present disclosure is to provide an apparatus for and a method of measuring permanent-magnet eddy-current loss, the apparatus and the method that are capable of measuring a desired magnetic flux density in real time, determining electric current for a magnetic field coil, and not dissipating heat generated in a permanent magnet sample to an iron core, thereby more precisely measuring eddy-current loss occurring in the permanent magnet sample.

According to an aspect of the present disclosure, there is provided an apparatus for measuring permanent-magnet eddy-current loss, the apparatus including an iron core configured with a moving part and a stationary part and forming a void between the moving part and the stationary part, a measurement jig combined with the iron core in such a manner as to be positioned in the void, and a permanent magnet sample combined with the measurement jig in such a manner as to be positioned in a center portion of the void, wherein the measurement jig is formed of a material that prevents heat generated in the permanent.

The apparatus may further include a magnetic field coil wound on the iron core, and supplying a magnetic flux density to the void when electric current is applied, a Gaussmeter measuring a value of the magnetic flux density of the void, a control device recognizing a value measured by the Gaussmeter and automatically adjusting electric current to be applied to the magnetic field coil to supply a predetermined magnetic flux density to the void, and a power supply device supplying electric current and a frequency that are transmitted from the control device to the magnetic field coil.

In the apparatus, the magnetic field coil may supply the magnetic flux density to the void when the electric current is applied thereto in a state where the permanent magnet sample is present in the void, the Gaussmeter may measure the value of the magnetic flux density of the void in the state where the permanent magnet sample is present in the void, and the control device may control operation of the power supply device in real time on the basis of a signal transmitted from the Gaussmeter.

In the apparatus, the measurement jig may include an upper jig and a lower jig, wherein the upper jig and the lower jig may be physically inserted into the moving part and the stationary part, respectively, of the iron core for being fixed thereto in such a manner as to face each other in the void.

In the apparatus, the permanent magnet sample may be physically inserted into the upper jig or the lower jig for being fixed thereto in such a manner as to be positioned in a center portion of the void between the upper jig and the lower jig.

In the apparatus, the measurement jig may be configured as one integrated measurement jig, and the permanent magnet sample may be combined with the one integrated measurement jig for being fixed thereto in such a manner as to be positioned in a center portion of the void.

In the apparatus, the measurement jig may be formed of non-magnetic and non-conductive engineering plastics.

In the apparatus, the magnetic flux density of the void may be measured through a Gaussmeter probe, and a measurement space into which the Gaussmeter probe is inserted may be provided in the measurement jig.

In the apparatus, a plurality of Hall sensors may be provided in the measurement jig, and the magnetic flux density of the void may be measured through the plurality of Hall sensors.

In the apparatus, the eddy-current loss in the permanent magnet sample may be represented by heat of the permanent magnet sample, and the heat of the permanent magnet sample may be dissipated to the control device through a temperature sensor connected to the measurement jig and may be converted into the eddy-current loss.

In the apparatus, the iron core may be mounted on a base jig of which a height is adjustable in an upward-downward direction, and the moving part of the iron core may be moved in the upward-downward direction when the base jig operates, and accordingly, a height of the void may be adjustable.

According to another aspect of the present disclosure, there is provided a method of measuring permanent-magnet eddy-current loss, the method including determining a magnetic flux density to be supplied to a void, supplying to a magnetic field coil electric current that results from converting a magnetic flux density determined in a state where a permanent magnet sample is present in the void, measuring the magnetic flux density of the void, adjusting electric current to be supplied to the magnetic field coil until the measured magnetic flux density of the void becomes at a desired value, recording temperature of the permanent magnet sample when the measured magnetic flux density of the void becomes at the desired value, and ending an experiment after recording measurement values when the permanent magnet sample satisfies a temperature saturation condition.

In the method, while the temperature of the permanent magnet sample is recorded in the recording of the temperature of the permanent magnet sample, feedback to the measuring of the magnetic flux density of the void occurs repeatedly through control logic, the magnetic flux density of the void may be frequently measured, and it may be checked whether or not the magnetic flux density of the void is kept at the desired value, and when the magnetic flux density of the void is not kept at the desired value, the adjusting of the electric current to be supplied to the magnetic field coil may be repeatedly performed until the magnetic flux density of the void becomes at the desired value.

In the method, from the determining of the magnetic flux density to the ending of the experiment may be automatically performed under the control of the control device.

The apparatus for and the method of measuring permanent-magnet eddy-current loss according to the present disclosure can provide an effect of measuring precise eddy-current loss through real-time measurement and adjustment of the magnetic flux density supplied by the Gaussmeter in a state where the permanent magnet sample is in a non-magnetized state.

Particularly, the magnetic flux density measured by the Gaussmeter is fed back to the control device, and thus operation of the power device can be controlled. Thus, an effect of efficiently conducting an experiment can be provided.

In addition, according to an embodiment of the present disclosure, the measurement jig formed of non-magnetic and non-conductive engineering plastics blocks the heat generated in the permanent magnet sample from being dissipated to the iron core. Accordingly, the precision of the experiment can be further increased. Thus, an effect of more precisely measuring the eddy-current loss occurring in the permanent magnet sample can be provided.

DETAILED DESCRIPTION

An embodiment of the present disclosure that is disclosed in the present specification or application will be described in terms of specific structures and functions for the purpose of illustration. However, the embodiment of the present disclosure may be practiced in various forms, and the present disclosure should not be construed as being limited to the embodiment described in the present specification or application.

Various modifications may be made in various ways to the embodiment of the present disclosure. Among these, a specific embodiment will be described in detail below with reference to the accompanying drawings. However, this description is not intended to limit the technical idea of the present disclosure to a specifically disclosed embodiment. All alterations, equivalents, and substitutes that are included within the scope of the technical idea of the present disclosure should be understood as falling within the scope of the present disclosure.

The terms first, second, and so on may be used to describe various constituent elements, but should not be construed to impose any limitation on the meanings of the constituent elements. These terms are only used to distinguish one constituent element from another. For example, a first constituent element may be termed a second constituent element without departing from the scope of each claim that defines the present disclosure. Likewise, the second constituent element may also be termed the first constituent element.

It should be understood that a constituent element, when referred to as being "coupled to" or "connected to" a different constituent element, may be directly coupled to or directly connected to the different constituent element or may be coupled to or connected to the different constituent element with an intervening constituent element interposed therebetween. By contrast, it should be understood that a constituent element, when referred to as being "directly coupled to" or "directly connected to" a different constituent element, is coupled to or connected to the different constituent element without any intervening constituent element interposed therebetween. The same is true for expressions describing a relationship between constituent elements. For example, expressions such as "between" and "directly between" and expressions such as "adjacent to" and "directly adjacent to" should also be construed in the same manner.

The terms used throughout the present specification are only for describing a specific embodiment and are not intended to impose any limitation on the present disclosure. A noun in a singular has the same meaning as a noun in a plural form unless nouns in singular and plural forms have different meanings in context. It should be understood that, throughout the present specification, the terms "include," "have," and the like are intended to indicate that a feature, a number, a step, an operation, a constituent element, a component, or any combination thereof is present, without precluding the possible presence or addition of one or more other features, numbers, steps, operations, constituent elements, or any combination thereof.

Unless otherwise defined, each of all the terms used throughout the present specification, including technical or scientific terms, has the same meaning as is normally understood by a person of ordinary skill in the art to which the present disclosure pertains. The term as defined in commonly used dictionaries should be construed as having the same contextual meaning as that in the related art and, unless otherwise explicitly defined in the present specification, should not be construed as having an excessively implied meaning or a purely literal meaning.

A control unit (controller) according to an exemplary embodiment of the present disclosure is realized by a nonvolatile memory (not illustrated) and a processor (not illustrated). The nonvolatile memory is configured to store data associated with an algorithm developed to control operation of each of various components of a vehicle or with a software command for executing the algorithm. The processor is configured to perform an operation described below using the data stored in the memory. The memory and the processor here may be realized as individual chips. Alternatively, the memory and the processor may be realized as a single integrated chip. The processor may be configured as a single processor or a plurality of processors.

An apparatus for and a method of measuring permanent-magnet eddy-current loss according to the present disclosure will be described below with reference to the accompanying drawings.

The apparatus for measuring permanent-magnet eddy-current loss according to the present disclosure, as illustrated in FIGS. 1 to 6, includes an iron core 10, a measurement jig 30, a permanent magnet sample 40, a magnetic field coil 50, a Gaussmeter 60, a control device 70, and a power supply device 80. The iron core 10 includes a moving part 11 and a stationary part 12, with a void 20 being positioned between the moving part 11 and the stationary part 12. The measurement jig 30 and the iron core 10 are positioned in the void 20. The permanent magnet sample 40 and the measurement jig 30 are positioned in a center portion of the void 20. The magnetic field coil 50 is wound on the iron core 10, and supplies a magnetic flux density to the void 20 when electric current is applied thereto. The Gaussmeter 60 measures a value of the magnetic flux density of the void 20. The control device 70 recognizes a value measured by the Gaussmeter 60 and automatically adjusts electric current to be applied to the magnetic field coil 50 in such a manner as to supply a predetermined magnetic flux density to the void 20. The power supply device 80 supplies electric current and a frequency that are transmitted from the control device 70 to the magnetic field coil 50.

Figure 1:
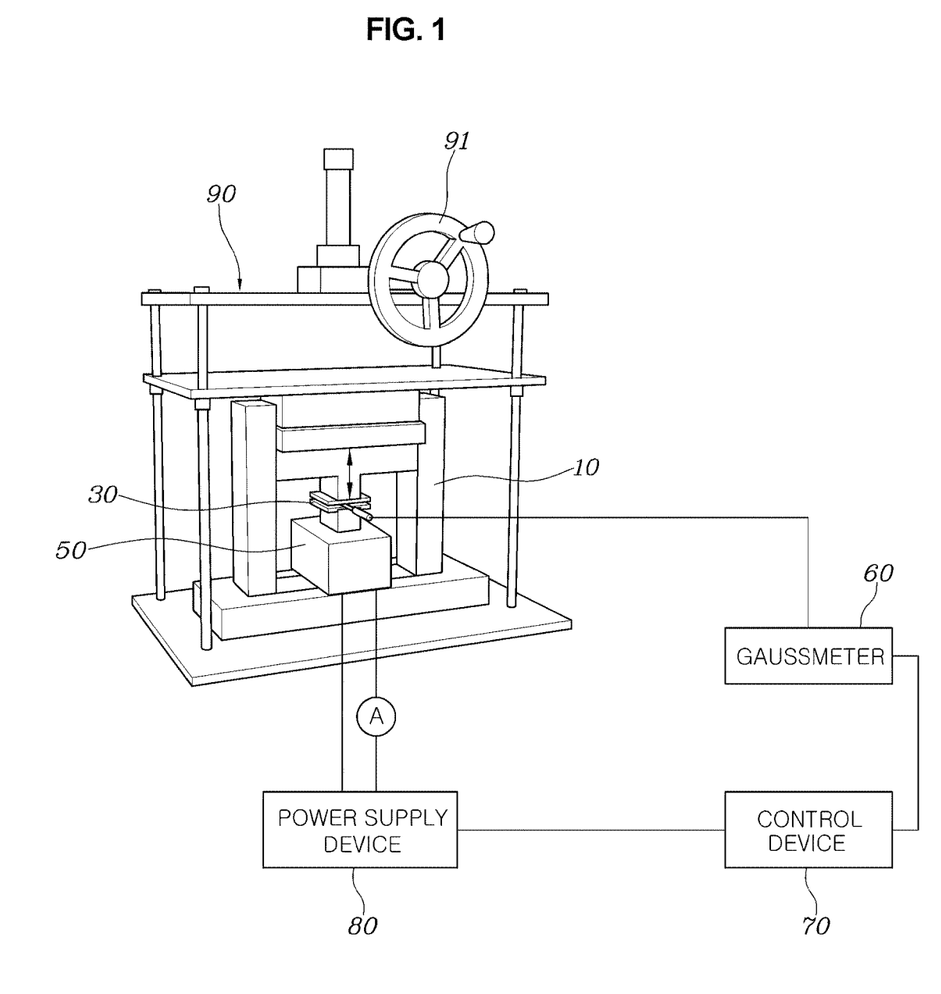
FIG. 1 is a view illustrating an apparatus for measuring permanent-magnet eddy-current loss according to the present disclosure.

The iron core 10 is mounted on a base jig 90 of which a height is adjustable in an upward-downward (vertical) direction.

The base zig 90 also includes a moving part and a stationary part, and is configured in such a manner that the moving part moves in the vertical (upward-downward) direction with respect to the stationary part through operation of a handle 91.

The moving part 11 of the iron core 10 is connected to the moving part of the base zig 90. The stationary part 12 of the iron core 10 is connected to the stationary part of the base zig 90. Thus, the moving part 11 of the iron core 10 is configured to move in the upward-downward direction when the base zig 90 operates. Accordingly, a height of the void 20 in the iron core 10 is adjustable for a thickness of the permanent magnet sample 40.

According to an embodiment of the present disclosure, the magnetic field coil 50 is configured to supply the magnetic flux density to the void 20 when electric current is applied thereto in a state where the permanent magnet sample 40 is present in the void 20. In addition, the Gaussmeter 60 is configured to measure the value of the magnetic flux density of the void 20 in the state where the permanent magnet sample 40 is present in the void 20. In addition, the control device 70 controls operation of the power supply device 80 in real time on the basis of a signal transmitted from the Gaussmeter 60.

An apparatus for evaluating eddy-current loss in the permanent magnet sample 40 serves the purpose of simulating an environment in which temperature increases due to eddy-current loss in a permanent magnet within a drive motor when the drive motor operates and thus measuring the eddy-current loss in a state where a one-piece permanent magnet is present.

The control device 70 performs a Fast Fourier Transform (FFT) analysis of input electric current applied to the drive motor and of the magnetic flux density of the void 20 when the drive motor operates. The control device 70 converts results of the analysis into electric current and a frequency that are necessary to evaluate the one-piece permanent magnet 40 and then transmits the electric current and the frequency to the power supply device 80.

The power supply device 80 applies the electric current and the frequency, which are transmitted from the control device 70, to the magnetic field coil 50. The magnetic field coil 50 supplies the magnetic flux density necessary for measurement to the void 20.

Figure 4:
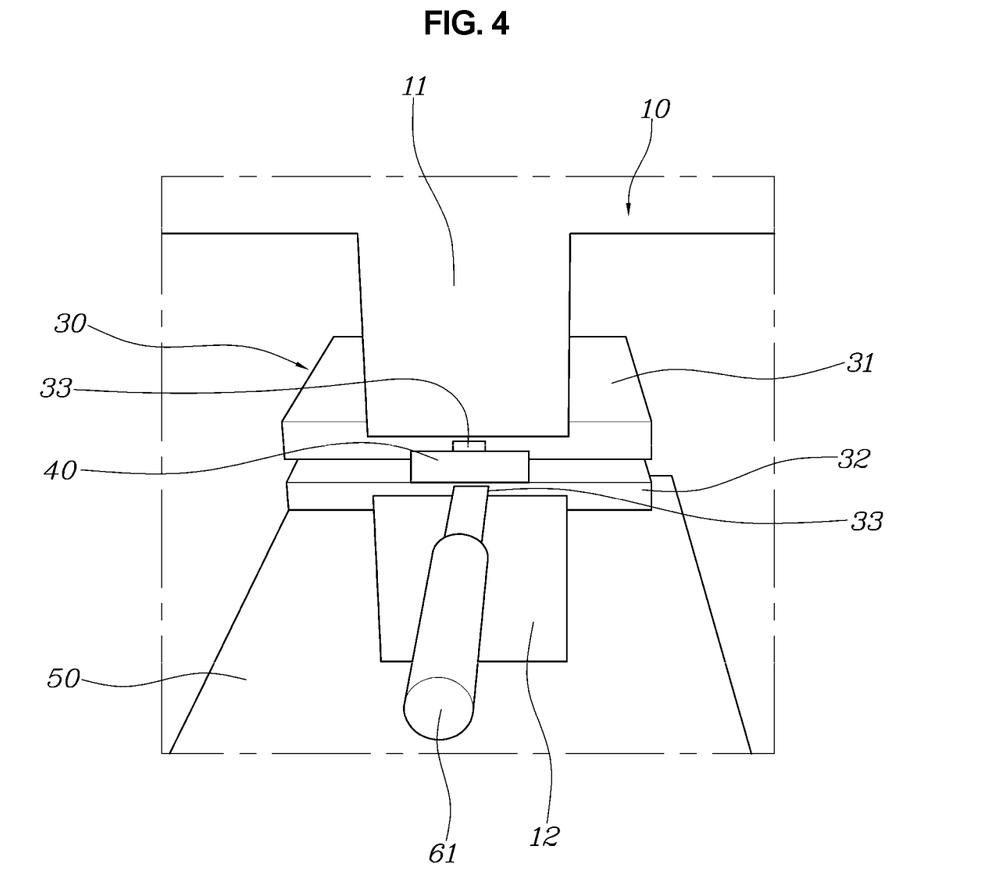
FIG. 4 is a view illustrating that a magnetic flux density of a void is measured using a Gaussmeter probe inserted into a measurement space in a measurement jig according to the present disclosure.

In this process, a Gaussmeter probe 61 inserted into the measurement jig 30 measures the value of the magnetic flux density of the void 20, and the value of the magnetic flux density of the void 20 is input into the control device 70 through the Gaussmeter 60.

The permanent magnet sample 40 is inserted into the measurement jig 30 and supplies the magnetic flux density to the permanent magnet sample 40 in a manner as described above. At this time, the permanent magnet sample 50 is in a non-magnetized state. Although the same amount of electric current as when a state of the void 20 is attained is supplied, a higher magnetic flux density is applied. Thus, the power supply device 80 may adjust electric current until the value of the magnetic flux density that is input into the control device 70 when the state of the void 20 is attained is reached, and may supply to the permanent magnet sample 40 a magnetic flux density having a value that is the same as the value of the magnetic flux density that is input into the control device 70.

The eddy-current loss in the permanent magnet sample 40 is represented by heat of the permanent magnet sample 40 and is expressed as in following Equation 1.

$$P_{eddy} = cvd(dT/dt),  \quad \text{Equation 1:}$$

where $P_{eddy}$ is eddy-current loss, c is specific heat of a permanent magnet, v is a volume of the permanent magnet, d is a density of the permanent magnet, dT/dt is an amount of change in temperature over time.

The heat of the permanent magnet sample 40 is dissipated to the control device 70 through a thermocouple and is converted into eddy-current loss using Equation 1.

Therefore, according to the embodiment of the present disclosure, there is an advantage in that precise eddy-current loss can be measured through real-time measurement and adjustment of the magnetic flux density supplied by the Gaussmeter 60 although the permanent magnet sample 40 is in the non-magnetized state.

The measurement jig 30 according to the present disclosure is formed of a material that prevents the heat generated in the permanent magnet sample 40 from being dissipated to the iron core 10. Specifically, it is desirable that the measurement jig 30 is formed of non-magnetic and non-conductive engineering plastics. However, the present disclosure is limited to the plastics.

In addition, there is an advantage in that the measurement jig 30 blocks the heat generated in the permanent magnet sample 40 from being dissipated to the iron core 10, thereby further increasing the precision of an experiment.

Figure 2:
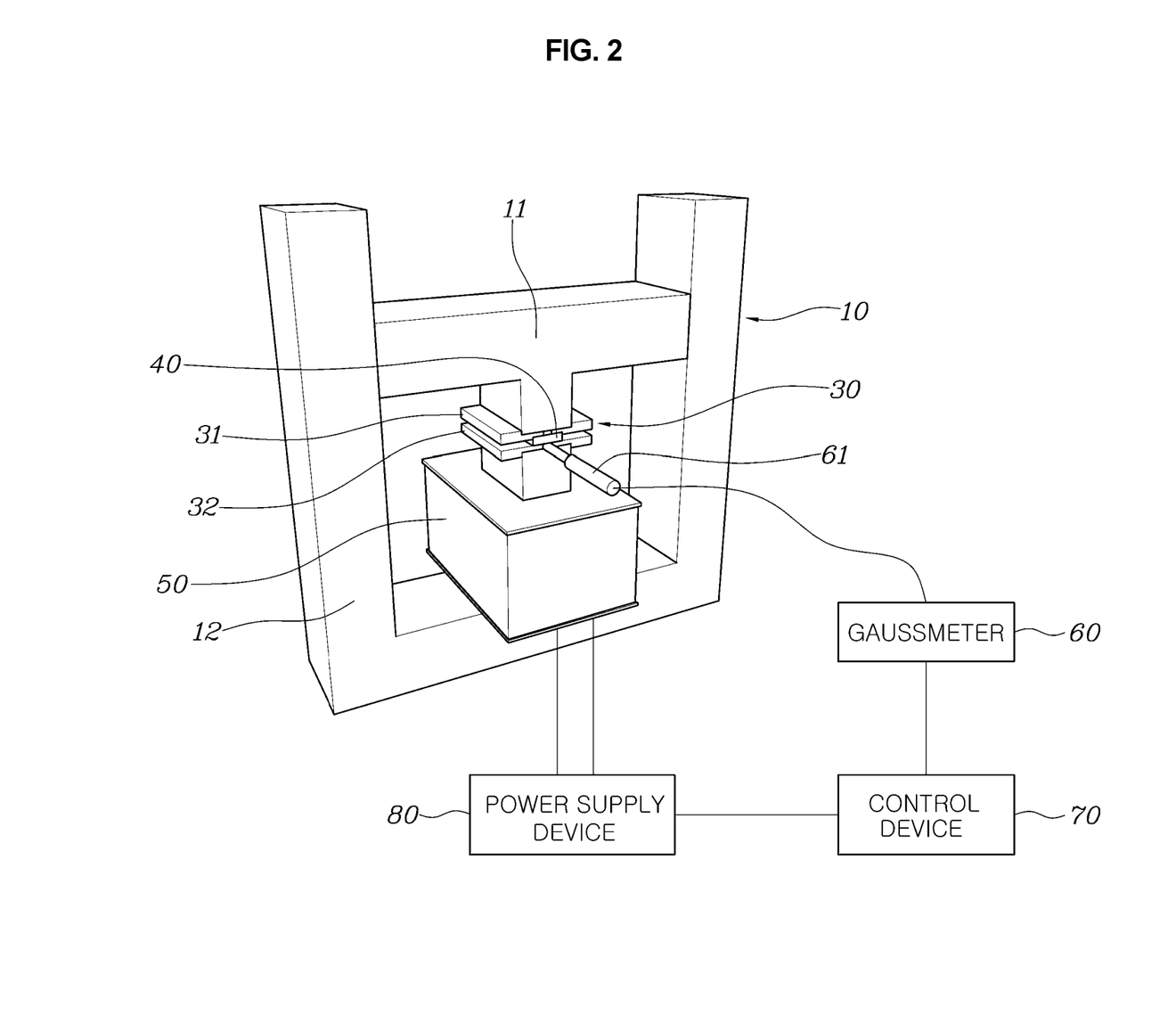
FIG. 2 is an enlarged view illustrating an iron core portion of FIG. 1.
Figure 3:
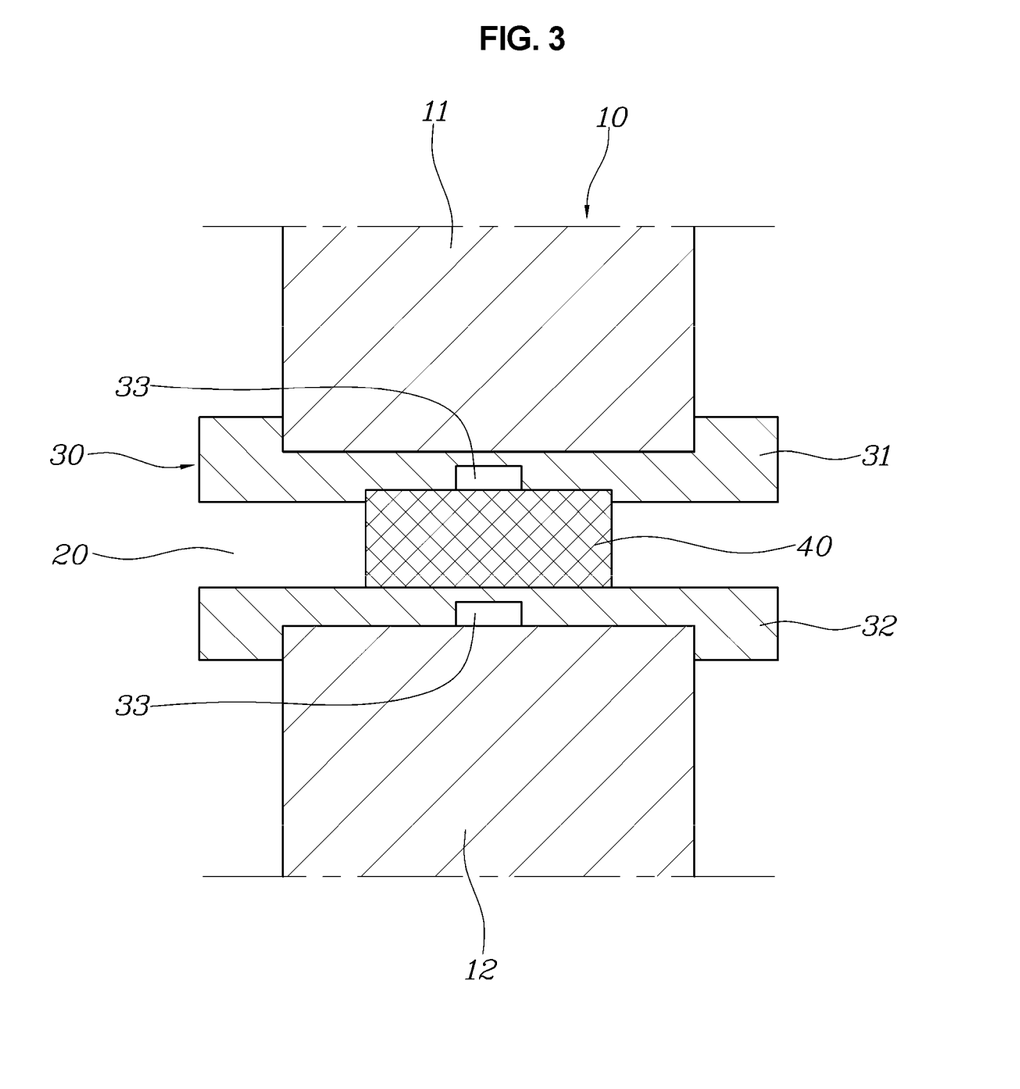
FIG. 3 is an enlarged view illustrating a void portion of FIG. 2.

A first implementation example of the measurement jig 30 according to the present disclosure, illustrated in FIGS. 2 to 4, may be configured to include an upper jig 31 and a lower jig 32 that are separated from each other. The upper jig 31 and the lower jig 32 are physically inserted into the moving part 11 and the stationary part 12, respectively, of the iron core 10 for being mounted thereon in a structurally fixed state in such a manner as to face each other in the void 20.

With reference to the drawings, a groove is formed in an upper surface of the upper jig 31, and another groove is formed in a lower surface of the lower jig 32. End portions of the moving part 11 and the stationary part 12 of the iron core 10 are inserted into the grooves, respectively, in the upper jig 31 and the lower jig 32 for being physically combined therewith in a structurally fixed state.

In addition, the permanent magnet sample 40 is physically inserted into the upper jig 31 or the lower jig 32 for being mounted thereon in a structurally fixed state and positioned in a center portion of the void 20 between the upper jig 31 and the lower jig 32.

With the drawings, a groove is formed in a lower surface of the upper jig 31. An upper portion of the permanent magnet sample 40 is inserted into the groove in the upper jig 31 to connect the permanent magnet sample 40 to the upper jig 31 in a structurally fixed state.

In addition, there is an advantage in that a higher precision result of measurement can be expected because the permanent magnet sample 40 is mounted in such a manner as to be positioned in the center portion of the void 20.

Figure 5:
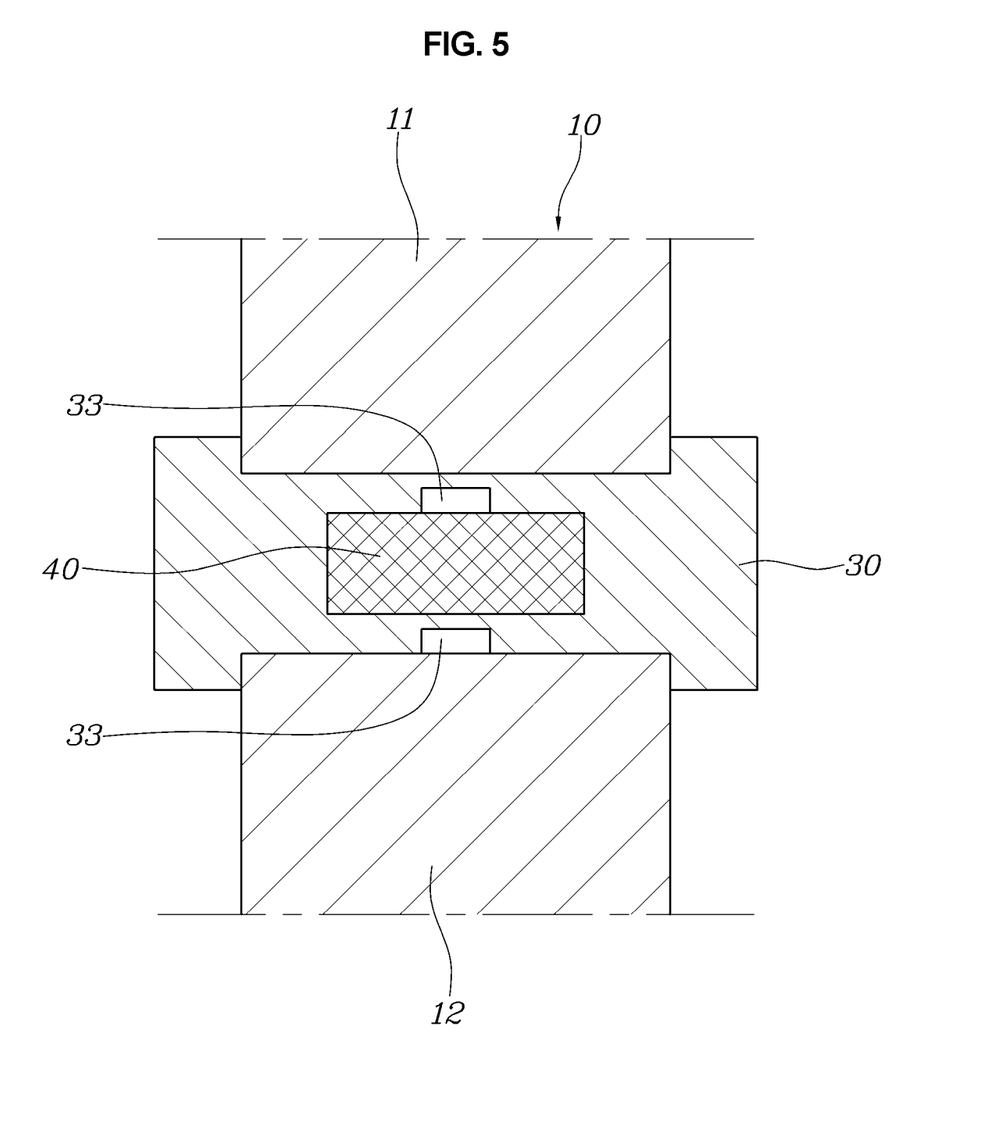
FIG. 5 is a view illustrating an implementation example where, according to the present disclosure, the measurement jig is configured as one integrated measurement jig.

A second implementation example of the measurement jig 30, illustrated in FIG. 5, may be configured as one integrated measurement jig. In this case, the permanent magnet sample 40 is connected to the one integrated measurement jig 30 for being fixed thereto and positioned in the center portion of the void 20.

According to the present disclosure, the magnetic flux density of the void 20 is measured through the Gaussmeter probe 61 electrically connected to the Gaussmeter 60. In this case, a measurement space 33 into which the Gaussmeter probe 61 can be inserted is provided in the measurement jig 30.

Therefore, the magnetic flux density of the void 20 can also be effectively measured in a state where the measurement jig 30 and the permanent magnet sample 40 are present in the void 20. Accordingly, the precise eddy-current loss can be measured through the real-time measurement and adjustment of the magnetic flux density supplied by the Gaussmeter 60.

Figure 6:
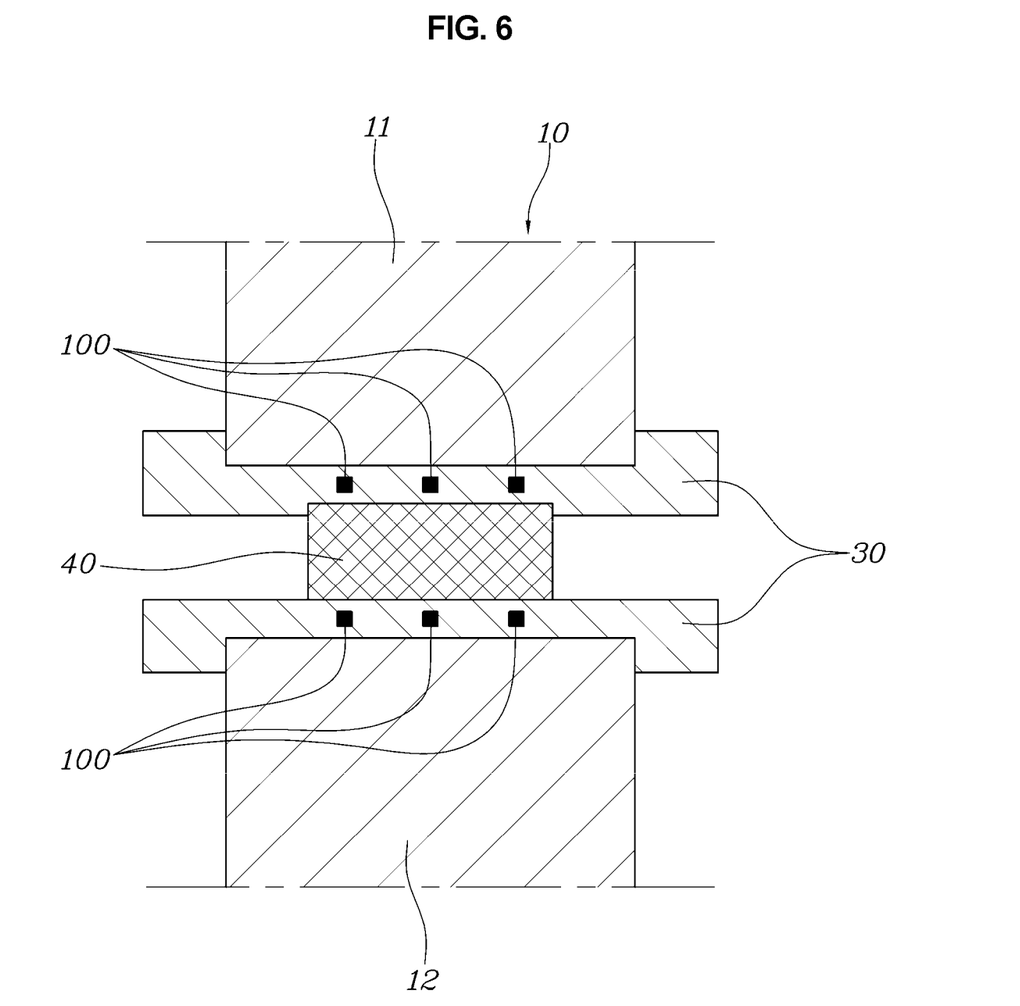
FIG. 6 is a view illustrating an implementation example where, according to the present disclosure, the magnetic flux density of the void is measured using a Hall sensor provided in the measurement jig.

As another example, as illustrated in FIG. 6, a plurality of Hall sensors (Hall ICs) 100 may be provided in the measurement jig 30. In this case, the magnetic flux density of the void 20 can be measured through the pluralities of Hall sensors 100. The measured magnetic flux density is transmitted to the control device 70 through the Gaussmeter 60.

The Hall sensor 100 has the advantage of being able to measure a distribution of the magnetic flux density.

Figure 7:
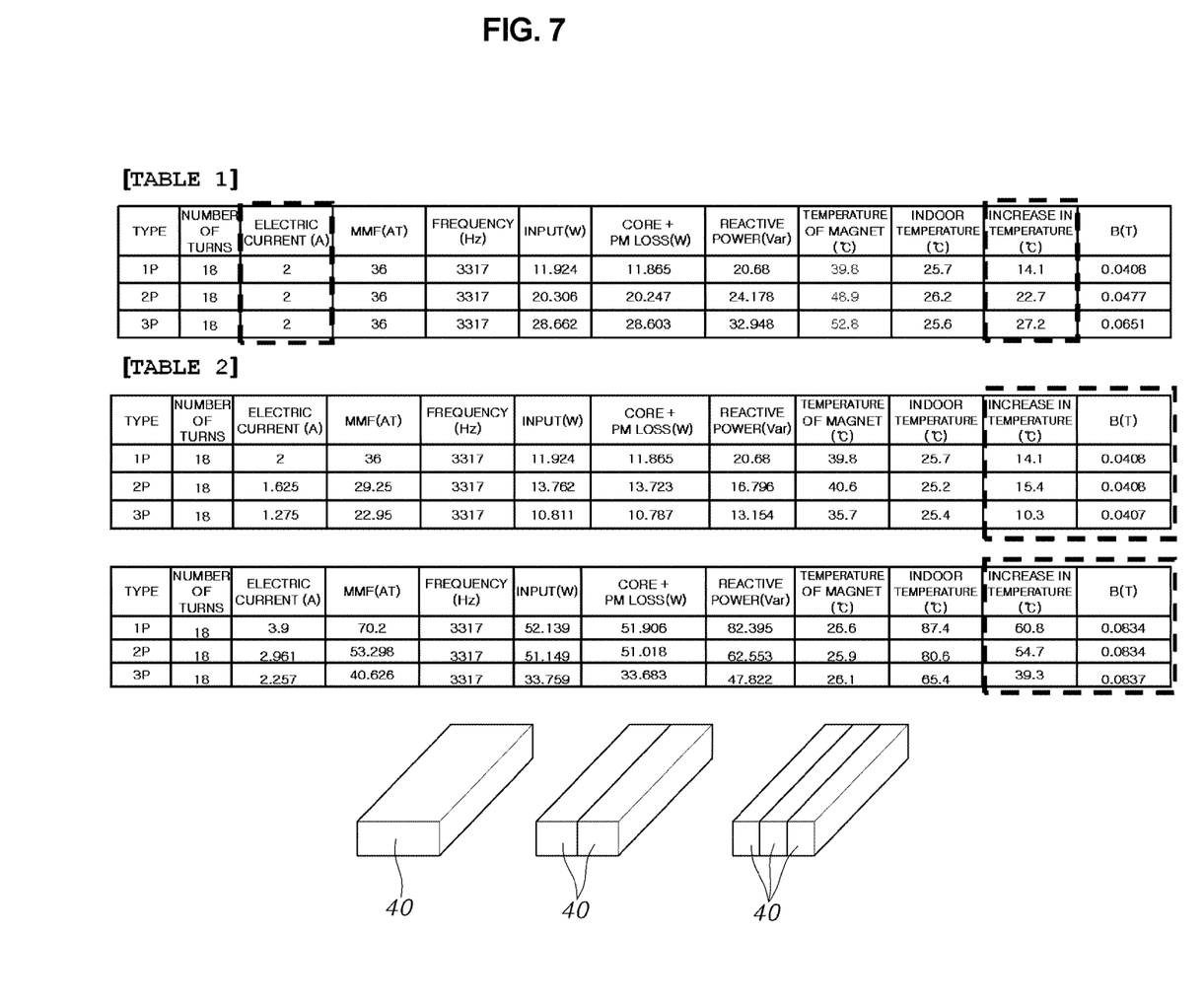
FIG. 7 is a table showing results of an experiment when electric current is supplied to a magnetic field coil in a non-magnetized state where a permanent magnet sample is not present in the void.

Table 1 in FIG. 7 shows the results of the experiment that were obtained when the same amount of electric current was applied to the magnetic field coil 50 for the one piece (1P) non-magnetized permanent magnet sample 40, the two piece (2P) non-magnetized permanent magnet sample 40, and the three-piece (3P) non-magnetized permanent magnet sample 40.

The permanent magnet sample 40 used in the experiment was manufactured as follows. A sintered pellet having a composition of Xwt % RE-Ywt % B-Zwt %™-Bal. wt % Fe (where RE=rare earth element, TM=3d transition element, X=28 to 35, Y=0.5 to 1.5, Z=0 to 15, and Bal means balance) was manufactured and then was machined into a magnet with a size of a=45 mm, b=15 mm, and c=6 mm. The objective of the experiment was to perform an evaluation of the eddy-current loss that varies according to whether or not a permanent magnet is divided, instead of an evaluation of the eddy-current loss that varies according to magnetic characteristics of the permanent magnet. Therefore, an additional process for grain boundary diffusion of a heavy rare earth element was not performed. The property of the sintered pellet for the permanent magnet was measured as Br=13.9 kG and Hcj=17.0 kOe. The sintered pellet was machined into one permanent magnet. This one permanent magnet was used as a one-piece permanent magnet. To manufacture a two-piece permanent magnet, the sintered pellet was machined into two smaller permanent magnets in a manner that was in parallel to b and c surfaces so that b=7.5 mm. Then, these two smaller permanent magnets were bonded to each other using a 1-part epoxy-based adhesive. To manufacture a three-piece permanent magnet, the sintered pellet was machined into three smaller permanent magnets in a manner that was parallel to the b and c surfaces so that b=5 mm. Then, these smaller permanent magnets were bonded to each other using a 1-part epoxy-based adhesive.

In theory, the greater the number of permanent magnets into which the sintered pellet is divided, the more the eddy-current loss is decreased, and the smaller an increase in temperature. However, the opposite result was obtained. It is thought that the opposite result is due to the fact that although the same amount of electric current was applied, the same magnetic flux density was not supplied to the void 20 according to magnetic permeability of each permanent magnet sample 40.

The Gaussmeter probe 61 was inserted into the measurement jig 30. Then, electric current for the magnetic field coil 50 was adjusted to maintain the same magnetic flux density of the void 20 regardless of the magnetic permeability of the permanent magnet sample 40. The results of measurements after this adjustment were shown in Table 2 in FIG. 7. From Table 2, it can be seen that an increase in temperature of the three-piece permanent magnet sample 40 got smaller. From Table 2, it can be seen that the magnetic flux density of the void 20 is required to be measured during the experiment in order to precisely measure the eddy-current loss in the non-magnetized permanent magnet sample 40.

Figure 8:
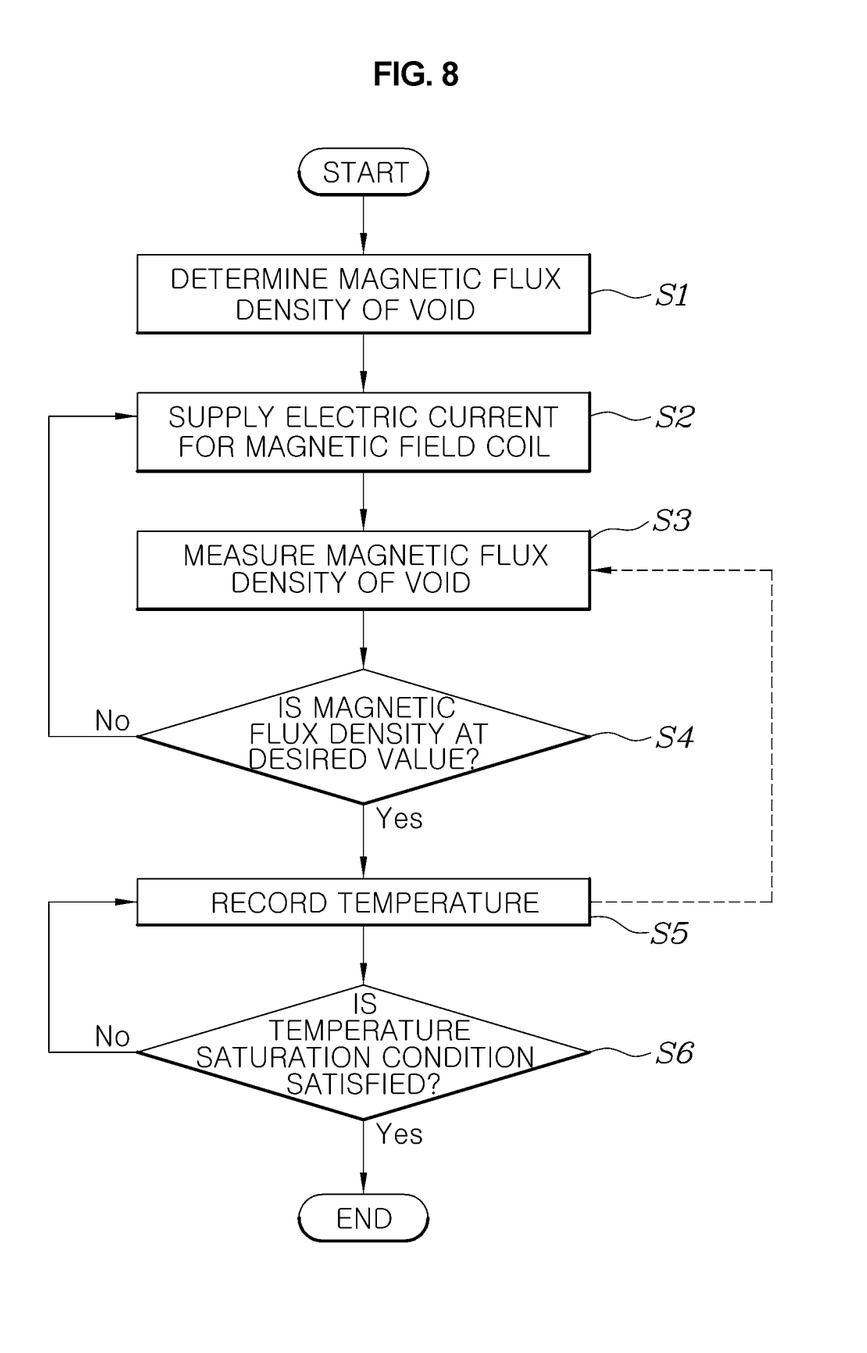
FIG. 8 is a flowchart illustrating a method of measuring permanent-magnet eddy-current loss according to the present disclosure.

A method of measuring permanent-magnet eddy-current loss according to the present disclosure, as illustrated in FIG. 8, includes determining a magnetic flux density to be supplied to a void 20 at S1, supplying electric current to a magnetic field coil 50 that results from converting a magnetic flux density determined in a state where the permanent magnet sample 40 is present in the void 20 at S2, and measuring the magnetic flux density of the void 20 at S3 The method further includes adjusting the electric current to be supplied to the magnetic field coil 50 until the measured magnetic flux density of the void 20 becomes at a desired value at S4. Then, the temperature of the permanent magnet sample 40 is recorded when the magnetic flux density of the void 20 becomes at the desired value at S5. Finally, when the permanent magnet sample 40 satisfies a temperature saturation condition, the experiment is ended after recording the measurement values at S6.

Step S2 is performed in the power supply device 80 under the control of the control device 70. Step S3 is performed through the Gaussmeter 60. S1 to S6 are all automatically performed under the control of the control device 70.

According to the present disclosure, while the temperature of the permanent magnet sample 40 is recorded in Step S5, feedback to Step S3 occurs repeatedly through control logic, the magnetic flux density of the void 20 is frequently measured, and it is checked whether or not the magnetic flux density of the void 20 is kept at the desired value. When the magnetic flux density of the void 20 is not kept at the desired value. Step S4 of adjusting the electric current to be supplied to the magnetic field coil 50 is repeatedly performed until the magnetic flux density of the void 20 becomes at the desired value.

According to the embodiment of the present disclosure, the magnetic flux density measured in the Gaussmeter 60 is fed back to the control device 70, and accordingly, the operation of the power supply device 80 is automatically controlled. Thus, the advantage of efficiently conducting an experiment can be achieved.

As described above, according to the embodiment of the present disclosure, although the permanent magnet sample 40 is in the non-magnetized state, the real-time measurement and adjustment of the magnetic flux density supplied by the Gaussmeter 60 are possible. Thus, the advantage of measuring the precise eddy-current loss can be achieved.

Particularly, the magnetic flux density measured in the Gaussmeter 60 is fed back to the control device 70, and thus the operation of the power supply device 80 is automatically controlled. Thus, the advantage of efficiently conducting an experiment can be achieved.

In addition, according to the embodiment of the present disclosure, the measurement jig 30 formed of non-magnetic and non-conductive engineering plastics blocks the heat generated in the permanent magnet sample 40 from being dissipated to the iron core 10. Accordingly, the precision of the experiment can be further increased. Thus, the advantage of more precisely measuring the eddy-current loss occurring in the permanent magnet sample 40 can be achieved.

The specific embodiment of the present disclosure is illustrated and described, but it would be obvious to a person of ordinary skill in the art that various modifications and alterations are possibly made to the present disclosure without departing from the technical idea of the present disclosure that is claimed in the following claims.

The invention claimed is:

1. An apparatus for measuring permanent-magnet eddy-current loss, the apparatus comprising:
   an iron core including a moving part and a stationary part, wherein a void is positioned between the moving part and the stationary part;
   a measurement jig connected to the iron core and positioned in the void; and
   a permanent magnet sample connected to the measurement jig and positioned in a center portion of the void,
   wherein the measurement jig is formed of a material that prevents heat generated in the permanent magnet sample from being dissipated to the iron core; and
   wherein the measurement jig comprises an upper jig and a lower jig, wherein the upper jig is inserted into the moving part of the iron core, and the lower jig is inserted into the stationary part of the iron core, wherein the upper jig and the lower jig face each other in the void.

2. The apparatus of claim 1, further comprising:
   a magnetic field coil wound on the iron core, and supplying a magnetic flux density to the void when an electric current is applied;
   a Gaussmeter configured to measure a value of the magnetic flux density of the void;
   a control device configured to recognize the value measured by the Gaussmeter, and to automatically adjust the electric current applied to the magnetic field coil to supply a predetermined magnetic flux density to the void; and
   a power supply device configured to supply the electric current, and to supply a frequency that is transmitted from the control device to the magnetic field coil.

3. The apparatus of claim 2, wherein the magnetic field coil supplies the magnetic flux density to the void when the electric current is applied in a state where the permanent magnet sample is present in the void, the Gaussmeter measures the value of the magnetic flux density of the void in the state where the permanent magnet sample is present in the void, and the control device controls operation of the power supply device in real time on the basis of a signal transmitted from the Gaussmeter.

4. The apparatus of claim 1, wherein the permanent magnet sample is inserted into the upper jig or the lower jig and positioned in a center portion of the void between the upper jig and the lower jig.

5. The apparatus of claim 1, wherein the measurement jig is formed of non-magnetic and non-conductive engineering plastics.

6. The apparatus of claim 1, wherein the magnetic flux density of the void is measured through a Gaussmeter probe, and a measurement space into which the Gaussmeter probe is inserted is provided in the measurement jig.

7. The apparatus of claim 1, wherein a plurality of Hall sensors are positioned in the measurement jig, and the magnetic flux density of the void is measured through the plurality of Hall sensors.

8. The apparatus of claim 1, wherein the eddy-current loss in the permanent magnet sample is represented by heat of the permanent magnet sample, and the heat of the permanent magnet sample is dissipated to the control device through a temperature sensor connected to the measurement jig and is converted into the eddy-current loss.

9. The apparatus of claim 1, wherein the iron core is mounted on a base jig having an adjustable in a vertical direction, and the moving part of the iron core moves in the vertical direction when the base jig operates, and a height of the void is adjustable.

10. A method of measuring permanent-magnet eddy-current loss using the apparatus of claim 2, the method comprising:
   determining the magnetic flux density to be supplied to the void;
   supplying the electric current to the magnetic field coil that results from converting the magnetic flux density determined in a state where a permanent magnet sample is present in the void;
   measuring the magnetic flux density of the void;
   adjusting the electric current to be supplied to the magnetic field coil until the measured magnetic flux density of the void reaches a desired value;
   recording a temperature of the permanent magnet sample when the measured magnetic flux density of the void reaches the desired value; and
   ending an experiment after recording measurement values when the permanent magnet sample satisfies a temperature saturation condition.

11. The method of claim 10, wherein, while the temperature of the permanent magnet sample is recorded in the recording of the temperature of the permanent magnet sample, feedback to the measuring of the magnetic flux density of the void occurs repeatedly through control logic, the magnetic flux density of the void is frequently measured, and whether the magnetic flux density of the void is kept at the desired value is checked, and when the magnetic flux density of the void is not kept at the desired value, the adjusting of the electric current to be supplied to the magnetic field coil is repeatedly performed until the magnetic flux density of the void reaches the desired value.

12. The method of claim 10, wherein the method is automatically performed under the control of the control device.

13. An apparatus for measuring permanent-magnet eddy-current loss, the apparatus comprising:
   an iron core including a moving part and a stationary part, wherein a void is positioned between the moving part and the stationary part;
   a measurement jig connected to the iron core and positioned in the void; and
   a permanent magnet sample connected to the measurement jig and positioned in a center portion of the void;
   wherein the measurement jig is formed of a material that prevents heat generated in the permanent magnet sample from being dissipated to the iron core; and
   wherein the measurement jig is configured as one integrated measurement jig, and the permanent magnet sample is connected to the one integrated measurement jig and positioned in a center portion of the void.

* * * * *